UNITED STATES PATENT OFFICE.

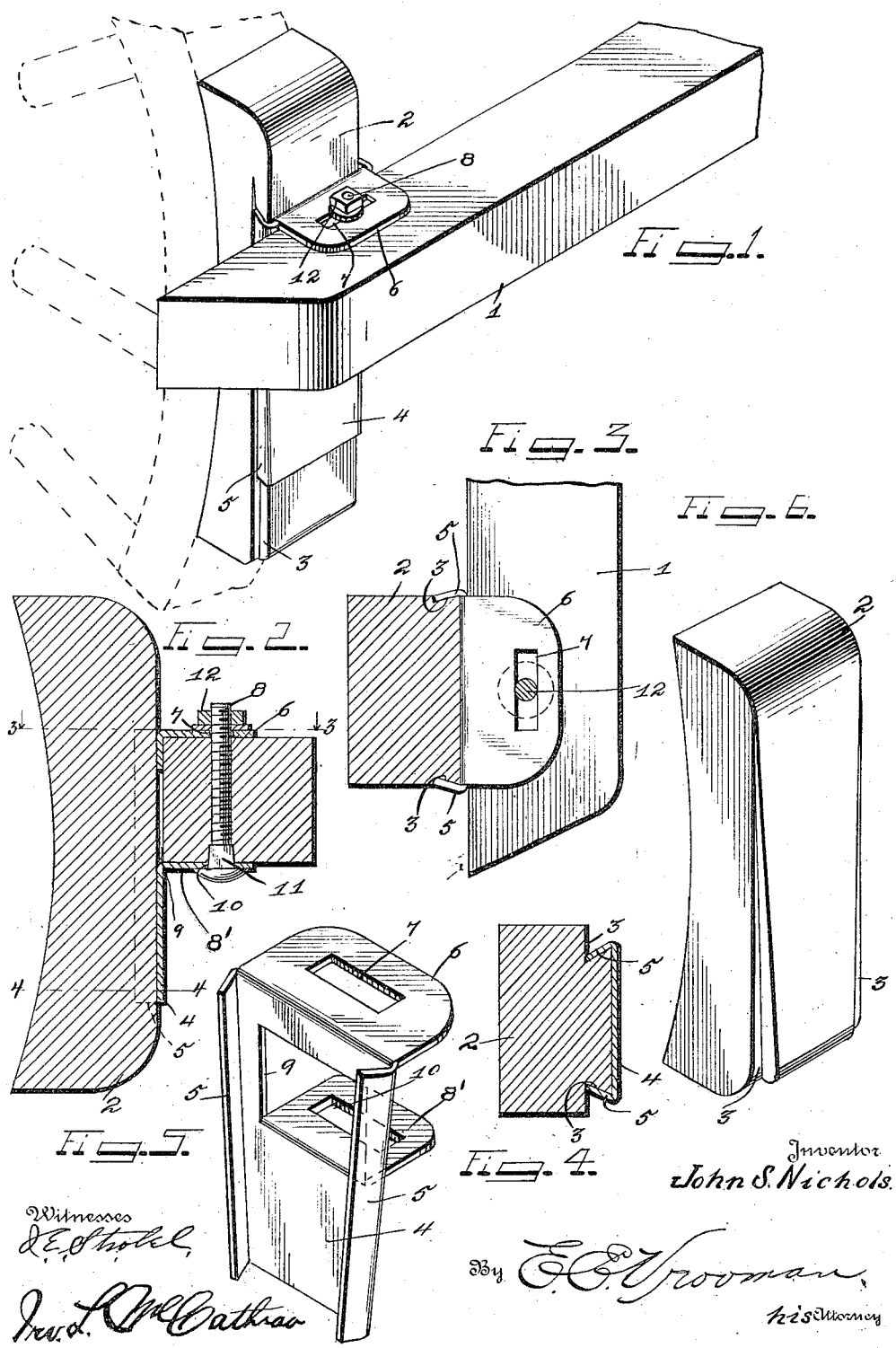

JOHN S. NICHOLS, OF BATESVILLE, ARKANSAS.

BRAKE-BLOCK HOLDER.

1,169,181.  Specification of Letters Patent.  Patented Jan. 25, 1916.

Application filed January 17, 1914. Serial No. 812,750.

*To all whom it may concern:*

Be it known that I, JOHN S. NICHOLS, citizen of the United States, residing at Batesville, in the county of Independence and State of Arkansas, have invented certain new and useful Improvements in Brake-Block Holders, of which the following is a specification, reference being had therein to the accompanying drawing.

This invention relates to brake blocks for carriages, wagons, and other vehicles and has for its object the production of a simple and efficient means for supporting the brake block in engagement with a brake beam.

Another object of this invention is the production of a brake block supporting plate which may be formed of sheet metal and may be struck from a blank sheet so as to insure a minimum amount of waste metal.

With these and other objects in view this invention consists of certain novel combinations, constructions, and arrangements of parts as will be hereinafter fully described and claimed.

In the accompanying drawing:—Figure 1 is a perspective view of the brake block secured to the brake beam. Fig. 2 is a vertical section through the brake block showing the manner in which the brake block supporting plate is attached to the beam. Fig. 3 is a section taken on line 3—3, of Fig. 2. Fig. 4 is a section taken on line 4—4, of Fig. 2. Fig. 5 is a perspective view of the brake block supporting plate. Fig. 6 is a detail perspective of the brake block.

As will be seen by considering the drawing 1 designates the brake beam which supports the brake block 2 by means of a brake block supporting plate to be hereinafter described. The brake block 2 is provided upon each side with a divergingly extending notched portion 3, which constitutes a substantially wedge-like connection for facilitating the connection of the brake block supporting plate thereto. The brake block supporting plate 4 comprises a sheet metal body tapering toward its lower end, which body is provided with a pair of side flanges 5, which flanges are turned inwardly and converge toward the lower end of the plate 4. The upper end of the brake block supporting plate is bent rearwardly so as to constitute a beam engaging flange 6 and is provided with a transversely extending aperture 7 to receive the securing bolt 8, which bolt passes through the brake beam 1. It will be seen that owing to the fact that the transversely extending aperture 7 is elongated as illustrated in Figs. 1 and 5 that this brake block supporting plate may be adjusted longitudinally of the beam 1 should it be so desired. The plate 4 is provided with an outwardly struck flange 8′ which is struck from the body thereof, thereby producing a centrally located aperture 9. The flange portion 8′ is provided with an elongated transversely extending aperture 10 through which the square portion 11 of the flange 8′ passes to facilitate the connection of the brake block supporting plate to the brake beam. A nut 12 is threaded upon the upper end of the bolt 8, whereby the flanges 6 and 8′ may be firmly clamped in engagement with the brake beam 1.

Having thus described the invention what is claimed as new, is:—

As a new article of manufacture, a brake block holder formed from a blank sheet of material comprising a body, said body provided with a pair of side flanges being slightly inturned and converging toward the lower end of said body, said body provided with a rearwardly extending flange upon the upper end thereof and bent at right angles to said body, said body provided with an outwardly struck flange arranged in spaced relation from said first-mentioned flange, and said flanges provided with apertures for receiving a securing bolt whereby said brake block holder may be efficiently connected to a brake beam.

In testimony whereof I hereunto affix my signature in presence of two witnesses.

JOHN S. NICHOLS.

Witnesses:
 J. A. HOLMES,
 ALONI PICKENS.